United States Patent Office 3,399,198
Patented Aug. 27, 1968

3,399,198
1-PYRIMIDINOYL- AND 1-IMIDAZOLOYL-3-HALOACETYL INDOLES
Tsung-Ying Shen, Westfield, and Lewis H. Sarett, Princeton, N.J., assignors to Merck & Co., Inc., Rahway, N.J., a corporation of New Jersey
No Drawing. Continuation-in-part of application Ser. No. 222,222, Sept. 7, 1962. This application Apr. 29, 1965, Ser. No. 452,015
1 Claim. (Cl. 260—256.5)

This application is a continuation-in-part of our copending application, Ser. No. 222,222, filed Sept. 7, 1962, now United States Patent No. 3,242,192 issued Mar. 22, 1966.

This invention relates to new chemical compounds. More particularly, it relates to a new class of compounds of the indole family. Still more particularly, it is concerned with new α-halogenated methyl 3-indolylacetic acids having an imidazole or pyrimidine carboxylic acyl attached to the nitrogen atom of the indole ring. It is concerned further with salts, esters and amide derivatives of such compounds. In addition, it is concerned with novel intermediates for preparing the foregoing α-halogenated methyl idolyl acetic acid compounds. It relates also to the synthesis of such substances.

The new heteroaroyl indolylacetic acid compounds of this invention have the general structural formula:

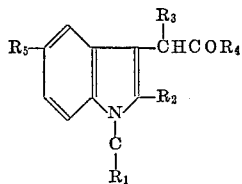

wherein $R_1$ is selected from the group consisting of imidazole, pyrimidine, and substituted imidazole and pyrimidine in which the substituents may be halogen, lower alkyl, lower alkoxy, phenoxy, cyanomethyl, trifluoromethyl, benzoyl, lower alkylsulfamyl, nitro, amino, dilower-alkylamino, phenyl, lower alkoxy, lower alkyl, benzyl, benzyloxy, loweralkylthio, benzylthio or lower alkanoylamino;

$R_2$ is selected from the group consisting of a hydrogen atom and lower alkyl, lower alkenyl, aryl, aralkyl, alkaryl, substituted alkyl and substituted aryl radicals;

$R_3$ is a halogenated methyl radical;

$R_4$ is selected from the group consisting of hydroxy, —NH$_2$, substituted —NH$_2$, amine salts, lower alkoxy, aralkoxy and —OM radicals, said M being a cation; and $R_5$ is selected from the group consisting of hydrogen, and halogen atoms, and lower alkyl, lower alkoxy, haloalkyl, nitro, amino, substituted amino, cyano, aminomethyl, alkyl-substituted aminomethyl, mercapto, dialkylsulfonamide and benzylmercapto radicals.

A critical feature of the above compounds is the presence of a heteroaroyl radical attached to the N–1 position of the indole nucleus. These acyl groups may be further substituted in the aromatic rings thereof with hydrocarbon groups or with functional substituents. The term "functional substituent," as used herein, is meant one other than hydrogen or hydrocarbon.

The aromatic rings (Ar) of such groups may contain, and in the preferred compounds do contain, at least one functional substituent. This substituent may be a hydroxy or an etherified hydroxy (hydrocarbonoxy) group such as a lower alkoxy, aryloxy or an aralkoxy radical, e.g., methoxy, ethoxy, isopropoxy, propoxy, allyloxy, phenoxy, benzyloxy, halobenzyloxy, lower alkoxybenzyloxy and the like. Said functional substituent may also be a nitro group, a halogen, an amino group or a substituted amino group, representative examples of which that might be mentioned are acylamino, amineoxide, ketimines, urethanes, lower alkylamino, lower dialkylamino, amidine, acylated amidines, hydrazine or a substituted hydrazine, alkoxy amines and sulfonated amines. Furthermore, said functional substituent may be a mercapto or a substituted mercapto radical of the type exemplified by alkylthio groups such as methylthio, ethylthio, and propylthio and arylthio or aralkylthio groups, e.g., benzylthio and phenylthio. The N–1 aroyl radical may, if desired, be haloalkylated, as with a trifluoromethyl, trifluoroethyl, perfluoroethyl, β-chloroethyl or like substituent, acylated as with acetyl, propionyl, benzoyl, phenylacetyl, trifluoroacetyl and like acyl groups, or it may contain a haloalkoxy or haloalkylthio substituent. In addition, the invention embraces compounds wherein the aroyl radical contains a sulfamyl, benzylthiomethyl, cyano, sulfonamido or dialkylsulfonamido radical. Further, it may contain a carboxy substituent, or a derivative thereof, such as an alkali metal salt or a lower alkyl ester of the carboxy radical, an aldehyde, azide, amide, hydrazide and the like, or an aldehyde derivative of the type represented by acetals or thioacetals. In the preferred compounds, the N–1 aroyl radical is benzoyl and the functional substituent is in the para position of the six-membered ring.

In accordance with this invention, the N–1 group may be imidazole carboxylic acid or pyrimidine carboxylic acyl derivatives, with or without substituents.

$R_2$, situated in the 2-position of the indole ring nucleus, may be hydrogen, although it is preferred that there be present at this position of the molecule a hydrocarbon radical having less than nine carbon atoms. Lower alkyl groups such as methyl, ethyl, propyl or butyl are the most satisfactory although aryl, alkaryl and aralkyl groups are also advantageous, such as phenyl, benzyl and tolyl. Furthermore, the alkoxy, halo, amino, substituted amino and nitro substituted derivatives of the foregoing are within the purview of this invention as are indoles having at the 2-position an unsaturated aliphatic radical such as allyl or vinyl or a cyclic aliphatic residue of the type cyclohexyl.

A further critical feature of the foregoing compounds is that they are 3-indolylacetic acids in which the acetic acid α-carbon atom is further substituted by a halogenated methyl group ($R_3$), including the mono-, di- and tri-halo substituted methyls, such as, for example, trifluoromethyl, difluoromethyl, dibromomethyl, fluorochloromethyl, chloromethyl, fluoromethyl, and the like.

In the preferred compounds of the invention, $R_5$ is a lower alkyl, lower alkoxy, nitro, amino or substituted amino group. Examples of the alkyl and alkoxys that are embraced herein are methyl, ethyl, propyl, t-butyl, methoxy, ethoxy, isopropoxy and the like radicals. Examples of the substituted aminos are those derived from alkyl amines such as methyl amine, ethyl amine, isopropyl amine, butyl amine, diethyl amine, ethyl-sec-butyl amine, diisopropyl amine and the like, alkanolamines such as ethanolamine, diethanolamine, 2-amino-1-butanol, morpholine and the like, aryl amines such as aniline, diphenylamine and the like, mixed aromatic-aliphatic amines such as monomethylaniline, monoethylaniline and the like, aralkyl amines such as benzylamine, β-phenyl-ethylamine and the like, halo-substituted aliphatic or aromatic amines such as β-chloroethylamine, para-chloroaniline, parachlorobenzyl amine and the like, and other substituted aliphatic or aromatic amines such as β-methoxyethyl amine, para-tolyl amine, para-methoxy aniline, and the like. $R_5$ is not limited to the foregoing classes of substituents, however, and may, if desired, represent substituents such as hydrogen, aryl, aryloxy, hydroxy, mercapto, halo, haloalkyl such as —CF$_3$, CHF$_2$ and the like, nitro, haloalkyl, cyano, sulfamyl, sulfoxide, aminomethyl, substituted aminomethyl, carboxy and carboalkoxy groups.

In addition to the α-(3-indolyl)acetic acids described herein, the esters, salts and amide derivatives thereof represent an additional aspect of the invention. The esters are important intermediates in the synthesis of the free acids, and in many cases are themselves of importance as end products. Among the preferred esters are the lower alkyl esters such as the methyl, ethyl, propyl or t-butyl esters, and the aralkyl esters such as the benzyl, p-halobenzyl, and like esters having less than nine carbon atoms. The salts of these new α-(1-heteroaroyl-3-indolyl)-acetic acids can be obtained by treatment of the free acid with base under mild conditions. In this manner there may be obtained salts of alkali metals such as lithium, sodium and potassium, the aluminum or magnesium salts, or salts of alkaline earth metals such as barium and calcium. Salts of organic amines such as alkylamine, morpholine, choline, methyl cyclohexylamine or glucosamine may be obtained by reacting the acid with the appropriate organic base. Salts of heavy metals such as zinc and iron are also within the purview of this invention.

The following compounds are representative of those contemplated by this invention and which may be prepared by the procedures discussed hereinbelow:

methyl α-trifluoromethyl-α-[1-(5-bromo-1-methylimidazole-4-carbonyl)-2-methyl-5-methoxy-3-indolyl]-acetate,
α-difluoromethyl-α-[1-(1-methylimidazole-2-carbonyl)-2,5-dimethyl-3-indolyl]-acetic acid,
methyl α-trifluoromethyl-α-[1-(2-methylthio-5-methylimidazole-1-carbonyl)-2-methyl-5-methoxy-3-indolyl]-acetate,
α-trifluoromethyl-α-[1-(1-methyl-5-nitroimidazole-4-carbonyl)-2-methyl-5-methoxy-3-indolyl]-acetamide,
ethyl α-difluorochloromethyl-α-[1-(1-,4-dimethyl-2-ethylthioimidazole-5-carbonyl)-2-methyl-5-methoxy-3-indolyl]-acetate,
benzyl α-fluoromethyl-α-[1-(2,6-dichloropyrimidine-4-carbonyl)-2-ethyl-5-methyl-3-indolyl]-acetate,
propyl α-trifluoromethyl-α-[1-(4-chloro-3-trifluoromethyl pyrimidine-5-carbonyl)-2-methyl-5-methoxy-3-indolyl]-acetate,
α-trifluoromethyl-α-[1-(4,5-dichloropyrimidine-5-carbonyl)-2-methyl-5-methoxy-3-indolyl]-acetic acid,
α-trifluoromethyl-α-[1-(4-chloro-2-ethylthiopyrimidine-5-carbonyl)-2-methyl-5-methoxy-3-indolyl]-acetamide
methyl α-bromomethyl-α-[1-(4-phenoxy-2-trifluoromethylpyrimidine-5-carbonyl)-2-methyl-5-methoxy-3-indolyl]-acetate,
α-trifluoromethyl-α-[1-(2-methylthio-5-methylimidazole-1-carbonyl)-2-methyl-5-methoxy-3-indolyl]-acetic acid and the like.

The α-halomethyl-1-aroyl-(or 1-heteroaroyl)-3-indolyl acetic acid compounds of this invention and their corresponding esters and amides have a high degree of antiinflammatory activity and are effective in the prevention and inhibition of granuloma tissue formation. Certain of them possess this activity in high degree and are of value in the treatment of arthritic and dermatological disorders and in like conditions which are responsive to treatment with anti-inflammatory agents. In addition, the compounds of this invention have a useful degree of antipyretic activity. For their purposes, they are normally administered orally in tablets or capsules, the optimum dosage depending, of course, on the particular compound being used and the type and severity of infection being treated. Although the optimum quantities of these compounds of this invention to be used in such manner will depend on the compound employed and the particular type of disease condition treated, oral dose levels of preferred compounds in the range of 1.0–2000 mg. per day are useful in control of arthritic conditions, depending on the activity of the specific compound and the reaction sensitivity of the patient.

The novel α-halogenated methyl 3-indolylacetic acids of this invention are prepared from 3-α-haloacetyl indoles that have been acylated in the N–1 position of the indole nucleus with an imidazole or pyrimidine carboxylic acyl radical. These useful synthetic intermediates are also novel compounds and an additional feature of this invention and may be chemically represented as follows:

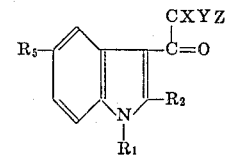

wherein X, Y and Z are selected from the class consisting of hydrogen, and halogen atoms, at least one of which is a halogen, preferably chlorine, bromine or fluorine, and $R_1$, $R_2$ and $R_5$ are as previously defined. They are preferably prepared by reacting an indole that is unsubstituted in the N–1 and C–3 positions, but having the desired $R_2$ and $R_5$ embellishments, with a member selected from the group consisting of halogenated acetic acid anhydride and halogenated acetyl halide to form the corresponding 3-haloacetyl indole which is then treated with an acylating agent capable of introducing the desired aromatic carboxylic acyl moiety in the N–1 position of the indole nucleus. Alternatively, the foregoing two steps may be reversed, that is, the starting indole may first be acylated in the N–1 position with the appropriate aroyl or heteroaroyl moiety followed by the introduction of the α-haloacetyl moiety in the C–3 position.

In either instance, the reaction of the indole with the respective halogenated acetic acid anhydride or halogenated acetyl halide is carried out by heating the reagents together at temperatures above 50° C. and preferably in the range of from 100–250° C. Preferably, the reaction is run at the reflux temperature of the particular halogenated acetic acid anhydride or halogenated acetyl halide employed. In the case of the lower boiling acetic anhydrides or acetyl halides, a closed reaction vessel will be advantageous.

The acylation reaction is preferably conducted by intimately contacting the N–1 unsubstituted indole with an imidazole or pyrimidine carboxylic acid halide in the presence of a strongly basic condensing agent, such as sodium hydride, potassium hydride, sodamide, an alkyl lithium or an alkali metal alkoxide, in a suitable solvent medium. The metallo derivative of the indole reactant forms first and this, in turn, reacts with the heteroaroyl halide to form the corresponding N–1 acylated indole.

An alternative method of acylating the 1-position is by use of an activated aryl ester of the acylating acid, such as the p-nitrophenyl ester. This latter is prepared by mixing the acid and p-nitrophenol in tetrahydrofuran and adding dicyclohexyl carbodiimide in tetrahydrofuran slowly. The dicyclohexylurea which forms is removed by filtration and the p-nitrophenyl ester is recovered from the filtrate. Alternatively, there can also be used the anhydride, azide or thiophenolic ester of the acylating acid. Whichever is used, the acylation of the α-(3-indolyl)-lower aliphatic acid starting material is achieved by forming a sodium salt of said material with sodium hydride in an anhydrous solvent and adding the acylating agent.

In the acylation step, the reaction medium is not unduly critical and it is preferred to employ anhydrous organic solvents such as, for example, the alkylformamides, such as dimethylformamide, diethylformamide and the like, aromatic hydrocarbons such as benzene, toluene and xylene, mixtures of said dialkylformamides and said aromatic hydrocarbons, ethers such as diethyl ether, 1,2-dimethoxyethane, tetrahydrofuran and diphenyl ether and nitrobenzene. The temperature of the reaction is not critical although it is preferred to carry out the acylation at temperatures ranging from 0–30° C. Lower temperatures may be employed if the particular reactants are unduly susceptible to decomposition.

In a preferred embodiment of this invention, the process of synthesizing the subject α-halomethyl 3-indolylacetic acids comprises condensing a 3-α-haloacetyl indole that is acylated in the N–1 position of the indole nucleus with an imidazole or pyrimidine carboxylic acyl radical of less than three fused rings with an α-halo ester to form a glycidic ester, converting said glycidic ester to its corresponding acid, decarboxylating said acid to an aldehyde,[1] treating said aldehyde with hydroxylamine to form the corresponding oxime, dehydrating said oxime to form the corresponding nitrile, treating said nitrile with alkanol and hydrogen halide to form an imino-alkyl ester hydrohalide which, upon hydrolysis, forms the corresponding alkyl ester, and hydrolyzing said alkyl ester under mild conditions.

Accordingly, the α-halogenated methyl-3-indolylacetic acids of this invention may be prepared by reacting a halogenated acetic acid anhydride with indole itself or an indole that has been presubstituted in the 2- and/or 5-positions with the desired embellishments, thereby introducing an α-haloacetyl group in the 3-position of the indole nucleus:

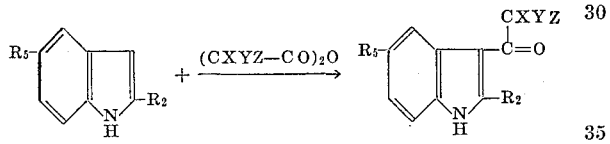

wherein $R_2$ and $R_5$ are substituents as previously described and X, Y and Z are selected from the group consisting of hydrogen and halogen atoms, at least one being a halogen. The resulting 3-α-haloacetyl indole is then acylated in the N–1 position by treatment with an acylating agent such as a heteroaroyl halide:

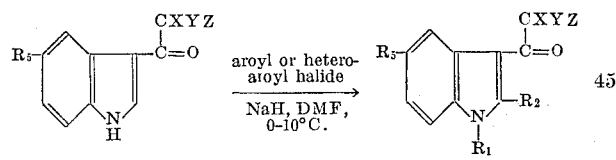

wherein $R_1$ is an aroyl or heteroaroyl group as previously described. Alternatively, the foregoing two steps may be reversed, that is, the starting indole could first be acylated in the N–1 position with the heteroaroyl moiety, followed by the introduction of the α-haloacetyl moiety in the 3-position. In either event, the resulting product is then condensed with an α-halo ester such as chloroacetic acid ester in the presence of a basic condensing agent such as sodium ethoxide, sodium amide or sodium hydride to form the corresponding α-β-epoxy ester (glycidic ester):

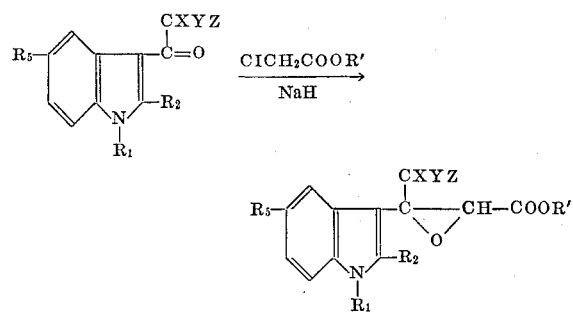

---
[1] A discussion on the formation of glycidic esters and their conversion to aldehydes will be found in Organic Reactions, vol. V, Adams et al., ch. 10 (1949), published by John Wiley & Sons, Inc. (New York).

wherein R′ is an alkyl or aralkyl radical. The glycidic ester condensation reaction is carried out under anhydrous conditions, with or without a solvent medium, and preferably in an inert atmosphere. The reaction is preferably run at 0° C. or below, temperatures as low as —80° C. being advantageous. After reaction periods ranging from a few hours to a few days, the reaction mixture is treated with dilute acid and the organic product extracted in the usual way by suitable organic solvents or separated by vacuum distillation. The resulting glycidic ester is then converted to the corresponding acid by mild alkaline hydrolysis, followed by decarboxylation to yield an aldehyde degraded by one carbon atom:

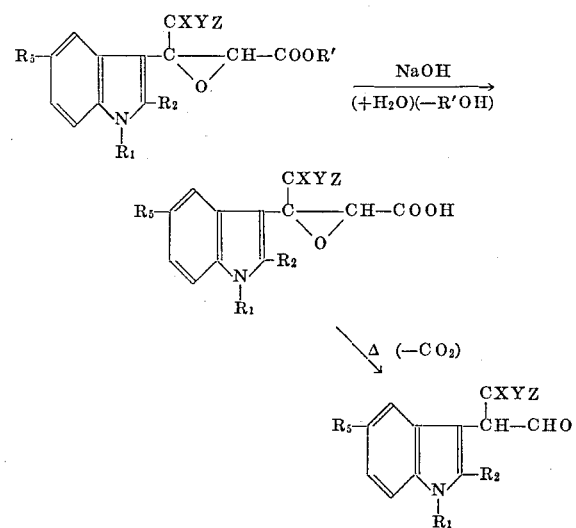

Alternatively, when R′ above is a tertiary alkyl radical, the glycidic ester is preferably converted to the degraded aldehyde by heating to the decomposition point, as, for example, by direct pyrolysis at 100° C.–200° C., under nitrogen and in the presence of powdered copper:

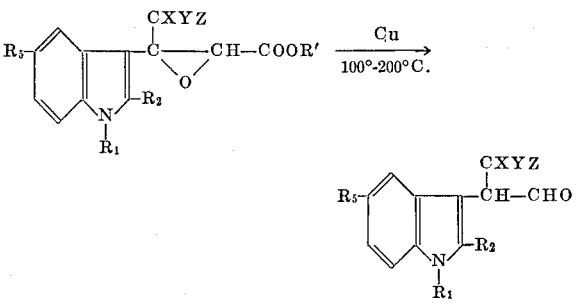

The foregoing aldehydes may be converted to an oxime by the usual treatment with hydroxylamine, such as, for example, by treatment with hydroxylamine acetate in aqueous ethanol to which a base is added with warming:

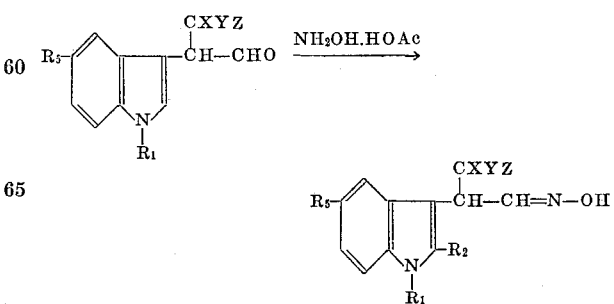

The resulting oxime is dehydrated to a nitrile as, for example, by treatment with a mild dehydrating agent such as acetic anhydride, or, preferably, by treatment with an alkyl or aryl chloroformate in the presence of base to form the corresponding alkyl or aryl cabonate ester, said carbonate ester then being pyrolyzed to yield the corresponding nitrile:

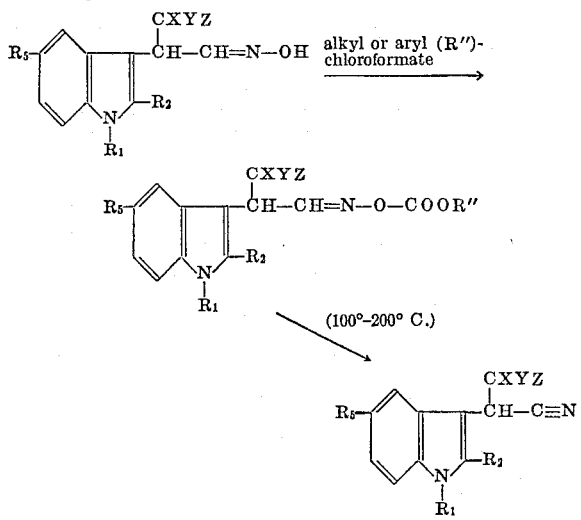

The resulting nitrile may be partially hydrolyzed, under mild alkaline or acidic conditions, to form the corresponding amides of this invention which, upon further hydrolysis, yields the corresponding acids themselves. Preferably, the resulting nitrile is converted to an alkyl ester by means of an intermediate imino-alkyl ester hydrohalide synthesis followed by hydrolysis. For example, the nitriles are treated in an alkanol (R'OH) solution with a hydrogen halide, such as hydrogen chloride and hydrogen bromide, in the strict absence of water to form the corresponding imino-alkyl ester hydrohalide. The addition of water to the reaction mixture leads to hydrolysis of the imino-ester with formation of the corresponding alkyl ester and ammonium chloride:

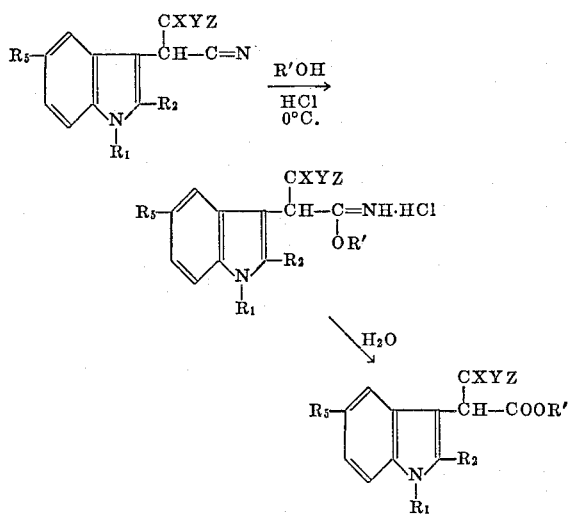

Said esters, which are embraced within the purview of this invention, are then hydrolyzed under mildly alkaline or mildly acidic conditions to yield the corresponding α-halo-methyl-3-indolylacetic acids of this invention:

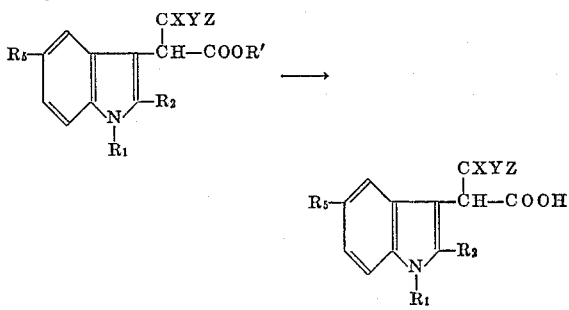

However, since the 1-acyl group of the above alkyl ester product may also undergo some hydrolysis, said acids are usually obtained in admixture with the corresponding N–1 unsubstituted (deacylated) α-halomethyl-3-indolyl-acetic acid and the aroyl or heteroaroyl moiety in its acid form. The novel acids of this invention are separated and recovered from such mixtures by conventional techniques such as fractional crystallization or by means of chromatography using a silica gel column and mixtures of ether-petroleum ether as the eluent.

The α-halogenated methyl 3-indolylacetic acid amides of this invention, acylated in the N–1 position with an imidazole or pyrimidine carboxylic acyl radical of less than three fused rings, may be prepared from the corresponding α-halogenated methyl 3-indolylacetic acids according to conventional techniques for the preparation of amides and N-substituted amides. For example, the respective acid may be converted to a symmetrical anhydride in the presence of a mild dehydrating agent such as dicyclohexyl carbodiimide and then treated with ammonia to yield the corresponding amide, or with a primary or secondary amine having the desired substituents in an inert solvent to yield the corresponding substituted amides. Alternatively, the respective acid may be converted to a mixed anhydride by treatment with a non-hydroxylic base such as, for example, a tertiary alkyl amine, pyridine and the like, to yield an acid salt, followed by treatment with an acid halide such as, for example, an alkyl or aryl chloroformate, phosphorous, oxychloride, thionyl chloride and the like, to yield the mixed anhydride which may then be treated with ammonia, primary amines or secondary amines to yield the corresponding amides. In addition, the α-halomethyl-3-indolylacetic acid amides of this invention may be prepared by the mild acid hydrolysis of the corresponding α-halomethyl-3-indolyl acetonitriles.

Among the primary and secondary amines that are operable herein are the alkyl amines such as methyl amine, ethyl amine, isopropyl amine, butyl amine, diethylamine, ethyl-sec-butylamine, diisopropyl amine and the like, alkanolamines such as ethanolamine, diethanolamine, 2-amino-1-butanol, morpholine and the like, aryl amines such as aniline, diphenylamine and the like, mixed aromatic-aliphatic amines such as monomethylaniline, monoethylaniline and the like, aralkyl amines such as benzylamine, β-phenylethylamine and the like, halo-substituted aliphatic or aromatic amines such as β-chloroethyl amine, parachloroaniline, para-chlorobenzyl amine and the like, and other substituted aliphatic or aromatic amines such as β-methoxyethyl amine, para-tolyl amine, para-methoxy aniline, and the like.

The α-halogenated methyl 3-indolylacetic acids may also be used to prepare the corresponding esters of this invention. For example, the respective acid may first be converted to symmetrical or mixed anhydrides as previously described and then reacted with a desired alkyl or aralkyl alcohol in the presence of a non-hydroxylic base such as, for example, a tertiaryalkyl amine, pyridine and the like, to yield the corresponding alkyl or aryl ester.

The synthesis of various compounds of this invention having on the indole ring system a 5-substituent which as a nitrogen attached to the homocyclic ring of the indole is generally based on the 5-nitro compound which may subsequently be transformed into the desired 5-substituent. Such transformation can be carried out in a number of ways. Reduction of the 5-nitrol groups gives a 5-amino group. Reaction of the amino with alkyl halides gives mono and dialkyl amino groups. If the alkyl halide is a dihaloalkylene group (e.g., 1,4-dibromobutane) a heterocyclic ring (e.g., pyrrolidino) is formed. Similarly, bis(β-chloroethyl)ether will give an N-morpholine compound. Alkylation can also be carried out simultaneous with reduction, as e.g., with formaldehyde and Raney nickel and hydrogen. Acylation can similarly be carried out on the 5-amino compounds or on the 5-nitro (with simultaneous reduction) to give 5-acylamido compounds. The 5-amino group can be reacted with isocyanates to give 5-ureido compounds.

This invention can be illustrated by the following examples:

EXAMPLE 1.—PREPARATION OF 2-METHYL-3-TRIFLUOROACETYL-5-METHOXYINDOLE

A mixture of 20 g. of 2-methyl-5-methoxyindole and 195 g. of trifluoroacetic anhydride is heated at 100° C. for 6 hours in a glass-lined bomb with occasional shaking. The reaction mixture is then cooled and filtered, yielding 15 grams of crude product. Recrystallization from ether yields 2-methyl-3-trifluoroacetyl-5-methoxyindole (M.P. 185–185.5° C.).

Analysis for $C_{12}H_{10}NO_2F_3$: Calculated: C, 56.03%; H, 3.91%; N, 5.44%. Found: C, 56.15%; H, 4.18%; N, 5.23%.

EXAMPLE 2

The procedure of Example 1 is followed, using as reactants, in lieu of the trifluoroacetic anhydride and 2-methyl-5-methoxyindole used therein, the equivalent quantities of the appropriate halo-substituted acetic anhydrides and indoles appropriately substituted in the C–2 and C–5 positions of the indole nucleus so as to yield the following respective products: 3-trifluoroacetylindole, 3-trichloroacetyl-2,5-dimethylindole, 3-difluoroacetyl-2,5-dimethylindole, 2-methyl-3-difluorochloroacetyl-5-methoxyindole, 2-ethyl-3-fluoroacetyl-5-methylindole, 2-phenyl-3-dichloroacetyl-5-methoxyindole, 2-p-tolyl-3-trichloroacetyl-5-methoxyindole, 2-methyl-3-dichloroacetyl-5-nitroindole, 2-ethyl-3-trifluoroacetyl-5-methylindole, 2-methyl-3-chloroacetyl-5-cyanoindole, 2-butyl-3-trifluoroacetyl-5-benzyloxyindole, 2-allyl-3-trifluoroacetyl-5-methoxyindole, 2-methyl-3-difluoroacetyl-5-methylthioindole, 2-methyl-3-trifluoroacetyl-5-dimethylaminoindole, 2-methyl-3-dibromoacetyl-5-allyloxyindole, 2-methyl-3-trifluoroacetyl-5-benzylmercaptoindole, 2-vinyl-3-trifluoroacetyl-5-methoxyindole, 2-p-methoxyphenyl-3-dichloroacetyl-5-methoxyindole, and 2-p-chlorophenyl-3-bromochloroacetyl-5-methoxyindole.

The 2- and/or 5-substituted indoles used as starting materials above may be prepared by a Fischer indole synthesis using the corresponding para-substituted phenylhydrazine (the para-substituent becoming the 5-substituent of the indole) and a reagent having the formula $CH_3$–CO–$R_2$ (in which $R_2$ becomes the 2-substituent of the indole), or by following the procedures set forth in U.S. Patent No. 2,825,734.

EXAMPLE 3.—PREPARATION OF 1-(IMIDAZOLE-4-CARBONYL)-2-METHYL-3-TRIFLUOROACETYL-5-METHOXYINDOLE

To a solution of 3.23 g. (0.013 mole) of 2-methyl-3-trifluoroacetyl-5-methoxyindole in 40 cc. of freshly distilled dimethylformamide (DMF) at 0° C. are added 1.3 g. (0.026 mole) of a sodium hydride-mineral oil suspension (51% NaH) under nitrogen. 3.5 grams (0.020 mole) of imodazole-4-carboxylic acid chloride in 10 cc. of DMF are then added and the mixture stirred for 3 hours at 0° C. Excess ether is then added and the reaction mixture stirred at 0° C. for 50 minutes. The mixture is then filtered, the precipitate washed with ether, and the ether solution washed twice with water, dried over sodium sulfate, and concentrated in vacuo. Chromatography on 200 g. of silica gel with 5% (v./v.) ether in petroleum ether as the eluent yields 1.2 g. of a yellow oil which solidified on cooling in Dry Ice. Recrystallization from 5% (v./v.) ether in petroleum ether (cooled in Dry Ice) yields 0.57 g. of 1-(imidazole-4-carbonyl)-2-methyl-3-trifluoroacetyl-5-methoxyindole.

EXAMPLE 4.—1-(PYRIMIDYL-5-CARBONYL)-2-METHYL-3-TRIFLUORACETYL-5-METHOXYINDOLE

A. p-Nitrophenyl-5-pyrimidine carboxylate

In a 500 ml. round bottom flask (all equipment flame dried) is added 13.9 g. of p-nitrophenol and 5.3 g. 5-pyrimidine carboxylic acid in 250 ml. dry tetrahydrofuran. Through a dropping funnel is added over 30 minutes 20.6 g. of dicyclohexylcarbodiimide in 100 ml. of dry tetrahydrofuran. The reaction is allowed to run overnight with stirring. The dicyclohexylurea which forms during the reaction is filtered. The filter cake is washed with dry tetrahydrofuran. The solution is evaporated to dryness. The solid is taken up in benzene and washed with sodium bicarbonate solution and then with water and dried over anhydrous sodium sulfate. The solution is concentrated under vacuum to dryness. The solid p-nitrophenyl-5-pyrimidinylcarboxylate is then recrystallized from benzene.

B. 1-(pyrimidyl-5-carbonyl)-2-methyl-3-trifluoroacetyl-5-methoxyindole

In a 250 ml. round bottom flask (flame dried equipment) is placed at 0° C. with nitrogen, 100 ml. of dry dimethylformamide with 10.5 g. of 2-methyl-3-trifluoroacetyl-5-methoxyindole. To this is added 2.5 g. of 50% sodium hydride mineral oil mixture. After the mixture is stirred for 30 minutes there is added over 15 minutes a solution of 6.7 g. of p-nitrophenyl-5-pyrimidinyl carboxylate in 50 ml. dry dimethyl formamide. The reaction mixture is stirred for 4 hours at 0° C. under nitrogen followed by stirring under nitrogen at room temperature overnight. The reaction mixture is then poured into an ice-water-ether solution containing a few ml. of acetic acid and the layers are separated. The aqueous phase is washed with ether and the ether extracts are combined and dried over sodium sulfate. To the ether solution is added a saturated solution of hydrogen chloride gas in dry ether. The ether is decanted off, leaving a heavy oil. The oil is washed with ether followed by an addition of aqueous sodium bicarbonate solution. The product is then extracted with ether. The ether layer is dried over anhydrous sodium sulfate and concentrated to dryness. The product, 1-(pyrimidyl-5-carbonyl)-2-methyl-3-trifluoroacetyl-5-methoxyindole is crystallized from benzene-Skellysolve B.

EXAMPLE 5

The procedure of Example 4 is followed, using in place of pyrimidine-5-carboxylic acid in part A an equivalent quantity of each of the following acids and using the product in equivalent quantity in the procedure of part B to yield the corresponding 1-acyl-2-methyl-3-trifluoromethyl-5-methoxyindole.

1-methyl-2-iodoimidazole-4-carboxylic acid[1]
1-methyl-5-bromoimidazole-4-carboxylic acid[1]
1,2-dimethyl-5-cyanoimidazole-4-carboxylic acid[1]
1-benzoyl-5-bromoimidazole-4-carboxylic acid
1-methyl-5-nitroimidazole-4-carboxylic acid[1]
1,4-dimethyl-2-ethylthioimidazole-5-carboxylic acid[1]
1-methylimidazole-2-carboxylic acid
1-phenylimidazole-2-carboxylic acid
1-methyl-2-phenylimidazole-4-carboxylic acid
1-benzoyl-4-methylimidazole-5-carboxylic acid
1-ethoxymethylimidazole-4-carboxylic acid
1-benzyl-2-benzyloxyimidazole-5-carboxylic acid
1-benzylimidazole-2-carboxylic acid
2-methylthio-5-methylimidazole-1-carboxylic acid
4-acetaminoimidazole-1-carboxylic acid
pyrimidine-3-carboxylic acid
2,6-dichloropyrimidine-4-carboxylic acid

---

[1] Each of these is made by methylation of the 1-unsubstituted acid with methyliodide, followed by saponification with cold dilute alkali.

5-bromo-2-methylpyrimidine-4-carboxylic acid
2-methyl-5-phenylpyrimidine-4-carboxylic acid
2-methylthiopyrimidine-4-carboxylic acid
2-6-diethoxypyrimidine-4-carboxylic acid
5-bromo-2-methylthiopyrimidine-4-carboxylic acid
2,6-bis(ethylthio)pyrimidine-4-carboxylic acid
4-chloro-2-trifluoromethylpyrimidine-5-carboxylic acid
2-ethylsulfamylpyrimidine-5-carboxylic acid
4,5-dichloropyrimidine-5-carboxylic acid
2,4-dimethoxypyrimidine-5-carboxylic acid
2-benzylthiopyrimidine-5-carboxylic acid
4-chloro-2-ethylthiopyrimidine-5-carboxylic acid
4-phenoxy-2-trifluoromethylpyrimidine-5-carboxylic acid When any of the other 3-acylindoles prepared in Example 2 is used in the procedure of Example 4B with the nitrophenylester of any of these acids, all in equivalent quantity, the corresponding 1-acyl-3-haloacetylindoles are obtained.

EXAMPLE 6.—PREPARATION OF TERTIARY-BUTYL-$\beta$-[1-(PYRIMIDYL-5-CARBONYL)-2-METHYL-5-METHOXY-3-INDOLYL]-$\beta$-TRIFLUOROMETHYL GLYCIDATE To a solution of 0.03 mole of 1-(pyrimidyl-5-carbonyl)-2-methyl-3-trifluoroacetyl-5-methoxyindole and 0.045 mole of t-butyl chloroacetate in 250 ml. of dimethoxyethane are added, in portions, 5.2 g. of potassium t-butoxide at 0° C. with stirring and under nitrogen. The reaction mixture is stirred at room temperature for 18 hours and poured into 1 liter of iced water containing 3 ml. of acetic acid. The product is extracted with ether, dried over sodium sulfate, filtered and concentrated in vacuo. The residue is chromatographed on silica gel using mixtures of ether-petroleum ether in the range of 50–100% ether (v./v.) as the eluent to give the corresponding tertiary-butyl - $\beta$ - [1 - (pyrimidyl - 5 - carbonyl) - 2-methyl - 5 - methoxy - 3 - indoyl] - $\beta$ - trifluoromethyl glycidate.

EXAMPLE 7.—PREPARATION OF $\alpha$-[1-(PYRIMIDYL - 5 - CARBONYL - 2 - METHYL - 5 - METHOXY - 3 - INDOLYL] - $\alpha$ - TRIFLUOROMETHYL ACETALDOXIME A mixture of 3.5 g. of tertiary-butyl-$\beta$-[1-(pyrimidyl-5-carbonyl)-2-methyl-5-methoxy-3-indolyl] - $\beta$ - trifluoromethyl glycidate and about 500 mg. of copper powder is heated in an oil bath at 150–200° C. at 0.1 mm. Hg with stirring. As soon as the pyrolysis slows down, the reaction mixture is cooled in ice and the resulting $\alpha$-[1-(pyrimidyl - 5 - carbonyl) - 2 - methyl-5-methoxy-3-indolyl]-$\alpha$-trifluoromethyl acetaldehyde extracted with ether. The ethereal solution is concentrated in vacuo, dissolved in 50 ml. ethanol and treated with 2 g. of hydroxylamine acetate. The mixture is poured into water and extracted with ether. The ethereal solution is washed with dilute hydrochloric acid, aqueous sodium bicarbonate, water and dried. Evaporation of the solution gives a syrup which is chromatographed on 60 g. of silica gel using mixtures of ether-petroleum ether in the range of 30–60% ether (v./v.) as the eluent to give the corresponding $\alpha$-[1 - (pyrimidyl - 5 - carbonyl) - 2 - methyl - 5 -methoxy-3 - indolyl] - $\alpha$ - trifluoromethyl acetaldoxime.

EXAMPLE 8.—PREPARATION OF $\alpha$-[1-(PYRIMIDYL - 5 - CARBONYL) - 2 - METHYL - 5 - METHOXY - 3 - INDOLYL] - $\alpha$ - TRIFLUOROMETHYL ACETALDOXIME ETHYL CARBONATE To a solution of 150 mg. of $\alpha$-[1-(pyrimidyl-5-carbonyl) - 2 - methyl - 5 - methoxy - 3 - indolyl] - $\alpha$ - trifluoromethyl acetaldoxime in 3 ml. of pyridine is added about 0.2 g. of ethylchloroformate at 0° C. with stirring. The mixture is then stirred at room temperature for 2 hours, poured into water and extracted with ether. The ethereal solution is washed with water, dilute HCl and aqueous sodium bicarbonate and then dried over sodium sulfate. Evaporation of the solvent gives 140 mg. of the corresponding acetaldoxime ethyl carbonate.

EXAMPLE 9.—PREPARATION OF $\alpha$-[1-(PYRIMIDYL - 5 - CARBONYL) - 2 - METHYL - 5 - METHOXY - 3 - INDOLYL] - $\alpha$ - TRIFLUOROMETHYL ACETONITRILE 295 milligrams of $\alpha$ - [1 - (pyrimidyl - 5 - carbonyl)-2 - methyl - 5 - methoxy - 3 - indolyl] - $\alpha$ - trifluoromethyl acetaldoxime ethyl carbonate are heated at 1 mm. Hg in an oil bath at 150°–160° C. for 10 minutes. After cooling, the hard yellow film is dissolved in 20% (v./v.) ether in petroleum ether and the solution passed through an alumina (6 g.) column and eluted with 600 ml. of the same solvent to yield the corresponding $\alpha$-[1-(pyrimidine - 5 - carbonyl) - 2 - methyl - 5 methoxy - 3 - indolyl]-$\alpha$-trifluoromethyl acetonitrile.

EXAMPLE 10

A. Preparation of methyl $\alpha$-trifluoromethyl-$\alpha$-[1-(pyrimidine - 5 - carbonyl) - 2 - methyl - 5 - methoxy - 3-indolyl]-acetate A solution of 0.01 mole of $\alpha$-[1-(pyrimidine-5-carbonyl) - 2 - methyl - 5 - methoxy - 3 - indolyl] - $\alpha$ - trifluoromethyl acetonitrile and 0.01 mole of methanol in 50 ml. dry ether is treated with anhydrous hydrogen chloride at 0°–5° C. until the resulting imino methyl ester hydrochloride precipitates. The precipitate is collected, washed with ether and then treated with water to undergo hydrolysis and yield the corresponding methyl $\alpha$-trifluoromethyl - $\alpha$ - [1 - (pyrimidine - 5 - carbonyl) - 2 - methyl-5-methoxy-3-indolyl]-acetate.

B. In accordance with the above procedures, but substituting ethanol, isopropanol and tertiary butanol, respectively, for the methanol used therein, there are obtained the corresponding ethyl, isopropyl and tertiary butyl esters, respectively.

EXAMPLE 11.—PREPARATION OF $\alpha$-TRIFLUOROMETHYL - $\alpha$ - [1 - (PYRIMIDYL - 5 - CARBONYL)-2 - METHYL - 5 - METHOXY-3-INDOLYL] ACETIC ACID A solution of 3 g. of methyl $\alpha$-trifluoromethyl-$\alpha$-[1-(pyrimidyl - 5 - carbonyl) - 2 - methyl - 5 - methoxy - 3-indolyl]-acetate in 80 ml. of dioxane and 20 ml. of 2.5 N hydrochloric acid is maintained at 50° C. for several hours under a nitrogen atmosphere. The reaction mixture is concentrated in vacuo to about 30 ml., diluted with 200 ml. of water, and extracted with ether. The ethereal solution is washed with water, dried over sodium sulfate, filtered, and evaporated to a residue. The residue is chromatographed on 200 g. of silica gel using mixtures of ether in petroleum ether (v./v. 30%–100%) as eluent to yield $\alpha$-trifluoromethyl-$\alpha$-[1-(pyrimidyl-5-carbonyl)-2-methyl-5-methoxy-3-indolyl] acetic acid.

EXAMPLE 12

The procedures of Examples 6–11 are followed using an equivalent quantity of each of the other 1-acyl-3-haloacetyl indoles of Example 5 as the starting material in place of the 1-(pyrimidyl-5-carbonyl)-2-methyl-3-trifluoroacetyl-5-methoxyindole of Example 6, and equivalent quantities of the respective indolyl intermediates thereafter, to yield the corresponding $\alpha$-haloacetyl-$\alpha$-(1-acyl-3-indolyl) acetic acid.

EXAMPLE 13.—PREPARATION OF $\alpha$-TRIFLUOROMETHYL - $\alpha$ - [1 - (PYRIMIDYL - 5 - CARBONYL)-2 - METHYL - 5 - METHOXY-3-INDOLYL] ACETIC ACID ANHYDRIDE To a solution of 0.05 mole of $\alpha$-trifluoromethyl-$\alpha$-[1-(pyrimidyl - 1 - carbonyl) - 2 - methyl - 5 - methoxy - 3-indolyl] acetic acid in 300 ml. of dry tetrahydrofuran is added 0.025 mole of dicyclohexyl carbodiimide with ice-cooling and stirring. The mixture is allowed to remain at 0–5° C. for 1 hour and then at room temperature (about 25° C.) for an additional 4–6 hours. The solution is filtered to remove the dicyclohexylurea formed, and concentrated in vacuo to a residue. The resulting anhydride is recrystallized from a mixture of benzene and petroleum ether.

EXAMPLE 14

The procedure of Example 13 is followed using an equivalent quantity of each of the other α-halomethyl-1-acyl-3-indolyl acetic acids prepared in Example 12 in place of the α-trifluoromethyl-α-[1-(pyrimidyl-5-carbonyl)-2-methyl-5-methoxy-3-indolyl] acetic acid used therein to obtain the corresponding α-halomethyl-α-(1-acyl-3-indolyl) acetic acid anhydrides.

EXAMPLE 15

A. Preparation of N,N-dimethyl-α-trifluoromethyl-α-[1-(pyrimidyl - 5 - carbonyl) - 2 - methyl - 5 - methoxy - 3-indolyl]-acetamide A solution of 0.01 mole of α-trifluoromethyl-α-[1-(pyrimidyl - 5 - carbonyl) - 2 - methyl - 5 - methoxy - 3-indolyl] acetic acid anhydride in 50 ml. tetrahydrofuran is treated with 0.02 mole of anhydrous dimethylamine at 0° C. with stirring. After one-half hour, the solution is filtered to remove the dimethylamine salt and concentrated in vacuo to yield N,N-dimethyl-α-trifluoromethyl-α - [1 - (pyrimidyl - 5 - carbonyl) - 2 - methyl - 5 - methoxy-3-indolyl]acetamide which is recrystallized from a mixture of benzene and petroleum ether.

B. In accordance with the above procedure, but substituting an equivalent quantity of isopropylamine, diethanolamine, aniline, monomethylaniline, benzylamine, para-chloroaniline, β-methoxyethyl amine, morpholine and para-methoxy aniline, respectively, in place of the dimethylamine used therein, there are obtained, respectively, the corresponding N-substituted acetamides.

C. The procedure of paragraph 15 (A) is followed using dry ammonia gas instead of dimethylamine. The ammonia is bubbled through the tetrahydrofuran solution of the indolyl acid anhydride. The product is α-trifluoromethyl - α - [1 - (pyrimidyl - 5 - carbonyl) - 2 - methyl-5-methoxy-3-indolyl] acetamide.

D. The procedure of paragraph 15 (C) is followed using equivalent quantities of the other indolyl acid anhydrides prepared in Example 14 to yield the corresponding indolyl acetamides.

EXAMPLE 16

A. Preparation of isopropyl - α - trifluoromethyl-α-[1-(pyrimidyl - 5 - carbonyl) - 2-methyl-5-methoxy-3-indolyl] acetate A solution of 0.01 mole of α-trifluoromethyl-α-[1-(pyrimidyl - 5-carbonyl)-2-methyl-5-methoxy-3-indolyl]acetic acid anhydride, 0.01 mole of triethylamine and 0.01 mole of isopropanol in 50 ml. of dimethoxyethane is allowed to stand at 0° C. for 1 hour and then at room temperature for 4–6 hours. The solution is concentrated in vacuo to about 10 ml. and diluted with 50 ml. of ether. The ether solution is filtered from the triethylamine salt and then evaporated to give the isopropyl ester.

B. In accordance with the above procedure, but substituting an equivalent quantity of methanol, ethanol, tertiary-butanol, benzyl alcohol and β-phenylethyl alcohol, respectively, in place of the isopropanol used therein, there are obtained, respectively, the corresponding esters.

EXAMPLE 17

The procedures of Examples 15 and 16 are followed, respectively, using an equivalent quantity of each of the other α-halomethyl-α-(1-acyl-3-indolyl) acetic acid anhydrides prepared in Example 14 in place of the α-trifluoromethyl - α - [1-(pyrimidyl-5-carbonyl)-2-methyl-5-methoxy-3-indolyl] acetic acid anhydride used therein to obtain, respectively, the corresponding N - substituted acetamides and the corresponding esters.

EXAMPLE 18

A. Preparation of the morpholine salt of α-trifluoromethyl - α - [1 - (pyrimidyl - 5 - carbonyl)-2-methyl-5-methoxy-3-indolyl]acetic acid To a solution of 0.01 mole of α-trifluoromethyl-α-[1-(pyrimidyl - 5 - carbonyl)-2-methyl-5-methoxy-3-indolyl] acetic acid in 100 ml. of ether at 0° C. is added a solution of 0.01 mole of morpholine in 50 ml. of ether, dropwise, with stirring. The mixture is filtered and the resulting crystalline morpholine salt of α-trifluoromethyl-α-[1-(pyrimidyl - 5 - carbonyl)-2-methyl-5-methoxy-3-indolyl] acetic acid is washed with ether and dried in vacuo.

B. The procedure of paragraph 18 (A) above is followed using, in place of the indolyl acid used above, an equivalent quantity of each of the indolyl acids prepared in Examples 11 and 12 to produce the morpholine salt of each of said acids.

C. The procedure of paragraph 18 (A) above is followed using, in place of morpholine, an equivalent amount of each of the following amines, to yield the corresponding amine salts of α-trifluoromethyl-α-[1-(pyrimidyl-5-carbonyl)-2-methyl-5-methoxy-3-indolyl]acetic acid: trimethylamine, triethylamine, n-butylamine, aniline, choline, 2,3-xylidine and piperazine.

EXAMPLE 19

A. Preparation of sodium α-trifluoromethyl-α-[1-(pyrimidyl - 5 - carbonyl) - 2-methyl-5-methoxy-3-indolyl] acetate To a solution of 0.01 mole of α-trifluoromethyl-α-[1-(pyrimidyl - 5 - carbonyl)-2-methyl-5-methoxy-3-indolyl] acetic acid in 100 ml. of methanol at 0° C. is added a solution of 0.01 mole of sodium methoxide in 30 ml. of methanol with stirring. The mixture is concentrated in vacuo at 10–25° C. to about 30 ml. and diluted with 200 ml. ether. The precipitated sodium salt is collected on a filter, washed with ether and dried in vacuo.

B. The procedure of paragraph 19 (A) is followed using an equivalent quantity of each of the indolyl acids prepared in Example 12, to obtain the corresponding sodium salt of each of said acids.

C. The procedure of paragraph 19 (A) is followed using 0.01 mole of each of the following alkoxides or hydroxides in place of sodium methoxide, to produce the corresponding metal salts: potassium methoxide, aluminum isopropoxide, magnesium hydroxide and calcium hydroxide.

Various changes and modifications may be made in carrying out the present invention without departing from the spirit and scope thereof. Insofar as these changes and modifications are within the purview of the annexed claim, they are to be considered as part of our invention.

We claim:
1. A compound of the formula:

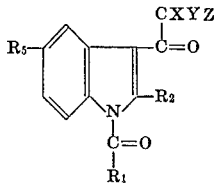

in which
  $R_1$ is selected from the group consisting of imidazole, pyrimidine and substituted imidazole and pyrimidine in which the substituents are selected from the group consisting of halogen, lower alkyl, lower alkoxy, phenoxy, cyanomethyl, trifluoromethyl, benzoyl, lower alkylsulfonyl, nitro, amino, dilower alkylamino, phenyl, lower alkoxy, lower alkyl, benzyl, benzyloxy, lower alkylthio, benzylthio and lower alkanoylamino, lower alkanoyl, halo lower alkanoyl, halo lower alkoxy, halo lower alkylthio, benzylthio, cyano di(lower alkyl)sulfonamido, carb-lower alkoxy, di(lower alkyl)carboxamide, phenyl, lower alkylsulfinyl and lower alkylsulfonyl;

$R_2$ is selected from the group consisting of hydrogen, lower alkyl, lower alkenyl, phenyl, tolyl and benzyl;

$R_5$ is selected from the group consisting of hydrogen, lower alkyl, lower alkoxy, $CF_3$, $CHF_2$, nitro, cyano, aminomethyl, amino, hydroxy, benzylmercapto, lower alkylthio, diphenylamino, benzylamino, β-phenylethylamino, chloro lower alkylamino, chloro phenylamino, chloro benzylamino, lower alkoxy-lower alkylamino, anisidino, lower alkylanilino and lower alkoxyanilino, and XYZ are selected from the group consisting of hydrogen and halogen, no more than two being hydrogen at any one time.

References Cited

UNITED STATES PATENTS

| | | | |
|---|---|---|---|
| 3,275,644 | 9/1966 | Shen | 260—302 |
| 3,316,267 | 4/1967 | Shen | 260—256.4 |
| 3,201,414 | 8/1965 | Shen | 260—326.12 |
| 3,242,192 | 3/1966 | Shen et al. | 260—319 |

OTHER REFERENCES

Yale, J. Med. Pharm. Chem., vol. 1 (1959), p. 121.

NICHOLAS S. RIZZO, *Primary Examiner.*

R. GALLAGHER, *Assistant Examiner.*